United States Patent
Murphy et al.

(10) Patent No.: US 12,120,145 B2
(45) Date of Patent: *Oct. 15, 2024

(54) THREAT INTELLIGENCE SYSTEM AND METHOD

(71) Applicant: RELIAQUEST HOLDINGS, LLC, Tampa, FL (US)

(72) Inventors: Brian P. Murphy, Tampa, FL (US); Joe Partlow, Tampa, FL (US)

(73) Assignee: RELIAQUEST HOLDINGS, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,711

(22) Filed: Jul. 13, 2022

(65) Prior Publication Data
US 2022/0353291 A1    Nov. 3, 2022

Related U.S. Application Data

(63) Continuation of application No. 16/552,693, filed on Aug. 27, 2019, now Pat. No. 11,418,536, which is a (Continued)

(51) Int. Cl.
*H04L 9/40* (2022.01)
*H04L 67/02* (2022.01)
*H04L 67/563* (2022.01)

(52) U.S. Cl.
CPC ...... *H04L 63/1441* (2013.01); *H04L 63/1408* (2013.01); *H04L 67/02* (2013.01); *H04L 67/563* (2022.05)

(58) Field of Classification Search
CPC . H04L 63/1441; H04L 63/1408; H04L 67/02; H04L 67/563
See application file for complete search history.

(56) References Cited

U.S. PATENT DOCUMENTS 6,742,128 B1    5/2004  Joiner
7,490,073 B1    2/2009  Qureshi et al.
(Continued)

FOREIGN PATENT DOCUMENTS

WO    00/14938 A1    3/2000
WO    02/098100 A1   12/2002
(Continued)

OTHER PUBLICATIONS

Threat Risk Modeling, Al-fedaghi et al, Feb. 2010 (Year: 2010).*
(Continued)

*Primary Examiner* — Jahangir Kabir
(74) *Attorney, Agent, or Firm* — Brian J. Colandreo; Jeffrey T. Placker; Holland & Knight LLP (57) ABSTRACT

A computer-implemented method, computer program product and computing system for importing threat data from a plurality of threat data sources, thus generating a plurality of raw threat data definitions. The plurality of raw threat data definitions are processed, thus generating a plurality of processed threat data definitions. The plurality of processed threat data definitions are processed to form a master threat data definition. The master threat data definition is provided to one or more client electronic devices.

18 Claims, 3 Drawing Sheets

Related U.S. Application Data continuation of application No. 15/202,213, filed on Jul. 5, 2016, now Pat. No. 10,397,267.

(60) Provisional application No. 62/187,922, filed on Jul. 2, 2015.

(56) References Cited

U.S. PATENT DOCUMENTS

| | | | |
|---|---|---|---|
| 7,752,664 | B1 | 7/2010 | Satish et al. |
| 7,773,540 | B1 | 8/2010 | Zatko |
| 8,150,803 | B2 | 4/2012 | Hoang et al. |
| 8,185,613 | B2 | 5/2012 | Xie et al. |
| 8,732,296 | B1 | 5/2014 | Thomas et al. |
| 9,027,135 | B1 | 5/2015 | Aziz |
| 9,336,385 | B1 | 5/2016 | Spencer |
| 9,462,013 | B1 | 10/2016 | Boss et al. |
| 9,602,536 | B1 | 3/2017 | Brown, Jr. et al. |
| 9,674,222 | B1 | 6/2017 | Joffe |
| 11,170,334 | B1 | 11/2021 | Orzechowski et al. |
| 2002/0038430 | A1 | 3/2002 | Edwards et al. |
| 2003/0074581 | A1 | 4/2003 | Hursey et al. |
| 2003/0120593 | A1 | 6/2003 | Bansal et al. |
| 2003/0120951 | A1 | 6/2003 | Gartside et al. |
| 2003/0188189 | A1 | 10/2003 | Desai et al. |
| 2004/0044912 | A1 | 3/2004 | Connary et al. |
| 2004/0078592 | A1 | 4/2004 | Fagone et al. |
| 2005/0050353 | A1 | 3/2005 | Thiele et al. |
| 2006/0075504 | A1 | 4/2006 | Liu |
| 2007/0214151 | A1 | 9/2007 | Thomas et al. |
| 2008/0034430 | A1 | 2/2008 | Burtscher |
| 2008/0148398 | A1 | 6/2008 | Mezack et al. |
| 2008/0162592 | A1 | 7/2008 | Huang et al. |
| 2008/0163354 | A1 | 7/2008 | Ben-Shalon et al. |
| 2009/0305687 | A1 | 12/2009 | Baldan |
| 2010/0125911 | A1* | 5/2010 | Bhaskaran ............ G06Q 10/10 715/781 |
| 2010/0205136 | A1 | 8/2010 | Glass, III |
| 2010/0246797 | A1 | 9/2010 | Chavez et al. |
| 2012/0167208 | A1 | 6/2012 | Buford et al. |
| 2014/0007238 | A1 | 1/2014 | Magee et al. |
| 2014/0096229 | A1 | 4/2014 | Burns et al. |
| 2014/0380456 | A1 | 12/2014 | Demopoulos et al. |
| 2015/0013006 | A1 | 1/2015 | Shulman et al. |
| 2015/0067848 | A1 | 3/2015 | Baikalov |
| 2015/0120725 | A1 | 4/2015 | de Vries et al. |
| 2015/0121529 | A1 | 4/2015 | Quinlan et al. |
| 2015/0215334 | A1 | 7/2015 | Bingham |
| 2015/0222656 | A1 | 8/2015 | Haugsnes |
| 2016/0065599 | A1* | 3/2016 | Hovor ................ H04L 67/10 726/23 |
| 2016/0164886 | A1 | 6/2016 | Thrash et al. |
| 2016/0323301 | A1 | 11/2016 | Boss et al. |
| 2017/0006058 | A1 | 1/2017 | Murphy et al. |
| 2017/0006061 | A1 | 1/2017 | Murphy et al. |
| 2017/0109370 | A1 | 4/2017 | Newhouse |
| 2021/0192044 | A1 | 6/2021 | Cui |

FOREIGN PATENT DOCUMENTS

| | | |
|---|---|---|
| WO | 2014138883 A1 | 9/2014 |
| WO | 2017004619 A1 | 1/2017 |

OTHER PUBLICATIONS

International Search Report issued in related Application Serial No. PCT/US2016/040994 on Sep. 26, 2016.
International Search Report issued in related Application Serial No. PCT/US2016/040987 on Sep. 15, 2016.
Zhuang, R., "A Theory for Understanding and Quantifying Moving Target Defense"; Kansas State University, PhD Dissertation; Publication [online]. Dec. 2015 [retrieved Aug. 25, 2016]. Retrieved from the Internet: ,URL: http://krex.k-state.edu/dspace/bitstream/handle/2097/20525/RUiZhuang2015.pdf?sequence=1&isAllowed=y>; pp. 1-224.
Non-Final Office Action issued on Mar. 22, 2018 in counterpart U.S. Appl. No. 15/202,213.
Non-Final Office Action issued on May 31, 2018 in counterpart U.S. Appl. No. 15/202,259.
Final Office Action issued in counterpart U.S. Appl. No. 15/202,213 on Aug. 13, 2018.
Final Office Action issued in U.S. Appl. No. 15/202,259 on Dec. 31, 2018.
Extended European Search Report issued in EP Application Serial No. 16818956.1 on Dec. 19, 2018.
Canada Office Action issued in CA Application Serial No. 2,994,535 on Oct. 29, 2018.
Canada Office Action issued in CA Application Serial No. 2,994,257 on Nov. 15, 2018.
Extended European Search Report issued in EP Application Serial No. 16818957.9 on Feb. 21, 2019.
Notice of Allowance issued in U.S. Appl. No. 15/202,213 on May 6, 2019.
Non-Final Office Action issued in U.S. Appl. No. 15/202,259 on May 30, 2019.
Canada Office Action issued in CA Application Serial No. 2,994,535 on Oct. 2, 2019.
Canada Office Action issued in CA Application Serial No. 2,994,257 on Nov. 18, 2019.
Final Office Action issued in counterpart U.S. Appl. No. 15/202,259 on Dec. 30, 2019.
Non-Final Office Action issued in counterpart U.S. Appl. No. 15/202,259 on Apr. 16, 2020.
Communication pursuant to Article 94(3) issued on Feb. 7, 2020 in related European Patent Application No. 16818956.1.
Final Office Action issued in counterpart U.S. Appl. No. 15/202,259 on Oct. 5, 2020.
Third Office Action issued in related Canadian Patent Application No. 2,994,257 on Sep. 14, 2020.
Non-Final Office Action issued in related U.S. Appl. No. 16/552,693 on Jan. 12, 2021.
Non-Final Office Action issued in related U.S. Appl. No. 15/202,259 on Feb. 4, 2021.
Final Office Action issued in related U.S. Appl. No. 16/552,693 on Apr. 30, 2021.
Final Office Action issued in related U.S. Appl. No. 15/202,259 on Jun. 9, 2021.
Non-Final Office Action issued in related U.S. Appl. No. 16/552,693 on Aug. 6, 2021.
Notice of Allowance issued in related Canadian Patent Application No. 2,994,257 dated Sep. 20, 2021.
Notice of Allowance issued in related Canadian Patent Application No. 2,994,535 dated Oct. 13, 2021.
Notice of Allowance issued in U.S. Appl. No. 15/202,259 dated Oct. 7, 2021.
Advanced Persistent Threats—detection and defense, Vukalovic et al, May 2015 (Year: 2015).
Notice of Allowance mailed on Dec. 10, 2021, in related U.S. Appl. No. 16/552,693, (17 pages).

* cited by examiner

THREAT INTELLIGENCE SYSTEM AND METHOD

RELATED APPLICATIONS

The subject application is a continuation of U.S. Non-Provisional application Ser. No. 16/552,693 filed 27 Aug. 2019 which is a continuation of U.S. Non-Provisional application Ser. No. 15/202,213, filed on Jul. 5, 2016, entitled "THREAT INTELLIGENCE SYSTEM AND METHOD" which claims the benefit of U.S. Provisional Application No. 62/187,922, filed 02 Jul. 2015, entitled "Threat Intelligence Engine", the contents of which are incorporated herein by reference.

TECHNICAL FIELD

This disclosure relates to threat detection systems and, more particularly, to automated threat detection systems.

BACKGROUND

Cyber security is a multi-billion dollar industry, wherein an entire industry is dedicated to stopping the relentless attack of computer infrastructures around the world. Often in this industry, various groups share information concerning various cyber treats. Unfortunately, the information concerning these cyber threats is often scattered amongst different locations, is often formatted in incompatible formats, and is often full of inaccuracies/redundancies.

SUMMARY OF DISCLOSURE

In one implementation, a computer-implemented method is executed on a computing device and includes importing threat data from a plurality of threat data sources, thus generating a plurality of raw threat data definitions. The plurality of raw threat data definitions are processed, thus generating a plurality of processed threat data definitions. The plurality of processed threat data definitions are processed to form a master threat data definition. The master threat data definition is provided to one or more client electronic devices.

One or more of the following features may be included. Importing threat data from a plurality of threat data sources may include one or more of: receiving the plurality of raw threat data definitions; and storing the plurality of raw threat data definitions into one or more database tables. Processing the plurality of raw threat data definitions may include one or more of: deduplicating the plurality of raw threat data definitions; cleaning the plurality of raw threat data definitions to remove false positives; converting the plurality of raw threat data definitions into a common format; determining a category for each of the plurality of raw threat data definitions; determining a source for each of the plurality of raw threat data definitions; determining a trust level for each of the plurality of raw threat data definitions; and determining an age level for each of the plurality of raw threat data definitions. Processing the plurality of processed threat data definitions to form a master threat data definition may include one or more of: combining the plurality of processed threat data definitions to form the master threat data definition; and formatting the master threat data definition into a format that is compatible with the one or more client electronic devices. Providing the master threat data definition to one or more client electronic devices may include one or more of: providing at least a portion of the master threat data definition to the one or more client electronic devices via an ETL script; and providing at least a portion of the master threat data definition to the one or more client electronic devices via one or more of an HTML report and a pre-formatted data export. The plurality of threat data sources may include one or more of: social network trader sources; public honeypot servers; private honeypot servers; and open source threat feeds. Importing threat data from a plurality of threat data sources may include one or more of: defining a list of specific keywords; and searching the social network trader sources for the specific keywords.

In another implementation, a computer program product resides on a computer readable medium and has a plurality of instructions stored on it. When executed by a processor, the instructions cause the processor to perform operations including importing threat data from a plurality of threat data sources, thus generating a plurality of raw threat data definitions. The plurality of raw threat data definitions are processed, thus generating a plurality of processed threat data definitions. The plurality of processed threat data definitions are processed to form a master threat data definition. The master threat data definition is provided to one or more client electronic devices.

One or more of the following features may be included. Importing threat data from a plurality of threat data sources may include one or more of: receiving the plurality of raw threat data definitions; and storing the plurality of raw threat data definitions into one or more database tables. Processing the plurality of raw threat data definitions may include one or more of: deduplicating the plurality of raw threat data definitions; cleaning the plurality of raw threat data definitions to remove false positives; converting the plurality of raw threat data definitions into a common format; determining a category for each of the plurality of raw threat data definitions; determining a source for each of the plurality of raw threat data definitions; determining a trust level for each of the plurality of raw threat data definitions; and determining an age level for each of the plurality of raw threat data definitions. Processing the plurality of processed threat data definitions to form a master threat data definition may include one or more of: combining the plurality of processed threat data definitions to form the master threat data definition; and formatting the master threat data definition into a format that is compatible with the one or more client electronic devices. Providing the master threat data definition to one or more client electronic devices may include one or more of: providing at least a portion of the master threat data definition to the one or more client electronic devices via an ETL script; and providing at least a portion of the master threat data definition to the one or more client electronic devices via one or more of an HTML report and a pre-formatted data export. The plurality of threat data sources may include one or more of: social network trader sources; public honeypot servers; private honeypot servers; and open source threat feeds. Importing threat data from a plurality of threat data sources may include one or more of: defining a list of specific keywords; and searching the social network trader sources for the specific keywords.

In another implementation, a computing system including a processor and memory is configured to perform operations including importing threat data from a plurality of threat data sources, thus generating a plurality of raw threat data definitions. The plurality of raw threat data definitions are processed, thus generating a plurality of processed threat data definitions. The plurality of processed threat data definitions are processed to form a master threat data definition. The master threat data definition is provided to one or more client electronic devices.

One or more of the following features may be included. Importing threat data from a plurality of threat data sources may include one or more of: receiving the plurality of raw threat data definitions; and storing the plurality of raw threat data definitions into one or more database tables. Processing the plurality of raw threat data definitions may include one or more of: deduplicating the plurality of raw threat data definitions; cleaning the plurality of raw threat data definitions to remove false positives; converting the plurality of raw threat data definitions into a common format; determining a category for each of the plurality of raw threat data definitions; determining a source for each of the plurality of raw threat data definitions; determining a trust level for each of the plurality of raw threat data definitions; and determining an age level for each of the plurality of raw threat data definitions. Processing the plurality of processed threat data definitions to form a master threat data definition may include one or more of: combining the plurality of processed threat data definitions to form the master threat data definition; and formatting the master threat data definition into a format that is compatible with the one or more client electronic devices. Providing the master threat data definition to one or more client electronic devices may include one or more of: providing at least a portion of the master threat data definition to the one or more client electronic devices via an ETL script; and providing at least a portion of the master threat data definition to the one or more client electronic devices via one or more of an HTML report and a pre-formatted data export. The plurality of threat data sources may include one or more of: social network trader sources; public honeypot servers; private honeypot servers; and open source threat feeds. Importing threat data from a plurality of threat data sources may include one or more of: defining a list of specific keywords; and searching the social network trader sources for the specific keywords.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
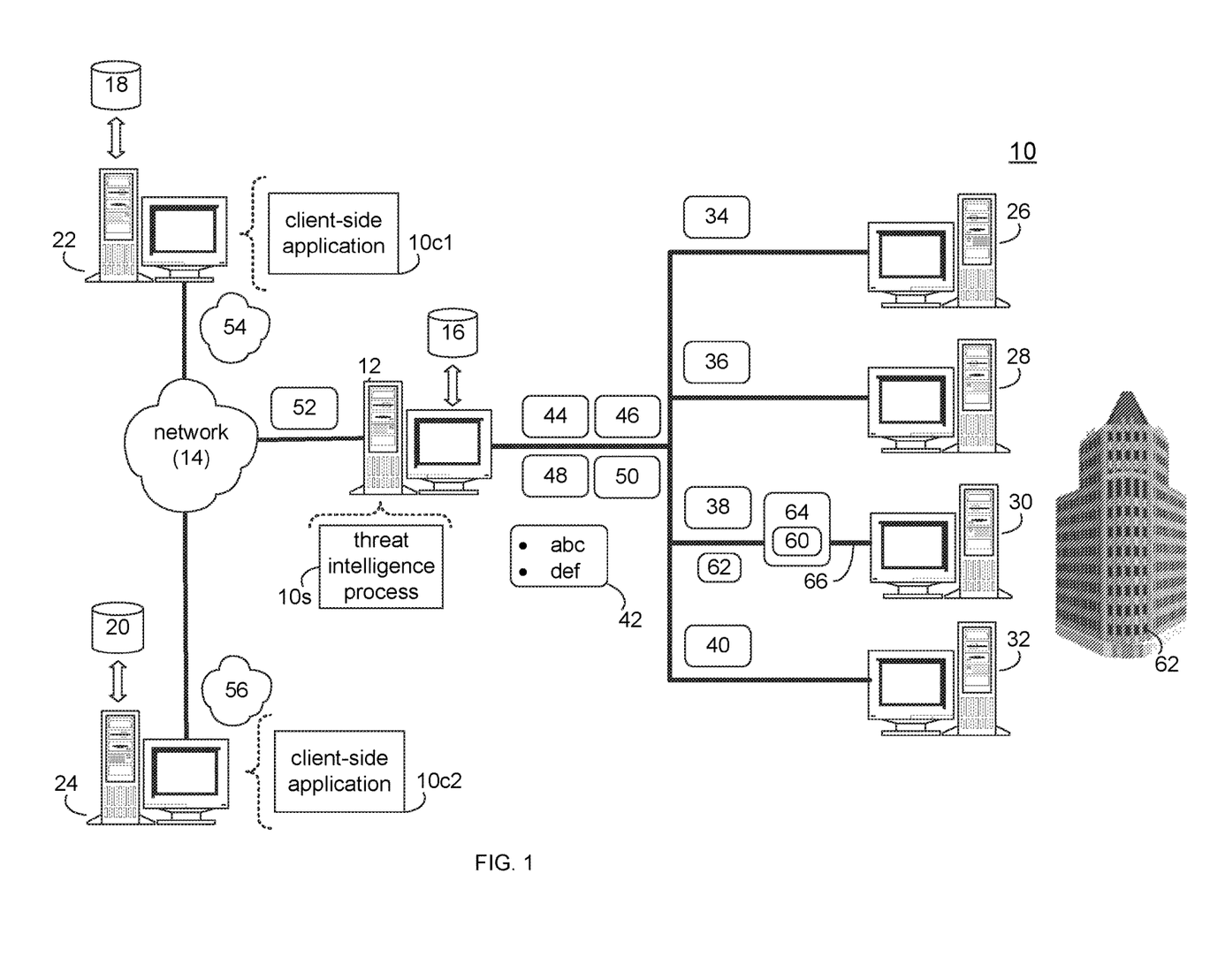
FIG. 1 is a diagrammatic view of a distributed computing network including a private honeypot and a computing device that executes a threat intelligence process according to an embodiment of the present disclosure.

In FIG. 1, there is shown threat intelligence process 10. Threat intelligence process 10 may be implemented as a server-side process, a client-side process, or a hybrid server-side/client-side process. For example, threat intelligence process 10 may be implemented as a purely server-side process via threat intelligence process 10s. Alternatively, threat intelligence process 10 may be implemented as a purely client-side process via one or more of client-side application 10c1 and client-side application 10c2. Alternatively still, threat intelligence process 10 may be implemented as a hybrid server-side/client-side process via threat intelligence process 10s in combination with one or more of client-side application 10c1 and client-side application 10c2. Accordingly, threat intelligence process 10 as used in this disclosure may include any combination of threat intelligence process 10s, client-side application 10c1 and client-side application 10c2.

Threat intelligence process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a cloud-based computing network.

The instruction sets and subroutines of threat intelligence process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Examples of client-side applications 10c1, 10c2 may include but are not limited to a web browser or a specialized application (e.g., an application running on e.g., the Windows™ platform, Android™ platform or the iOS™ platform). The instruction sets and subroutines of client-side applications 10c1, 10c2 which may be stored on storage devices 18, 20 (respectively) coupled to client electronic devices 22, 24 (respectively), may be executed by one or more processors (not shown) and one or more memory architectures (not shown) incorporated into client electronic devices 22, 24 (respectively).

Examples of storage devices 18, 20 may include but are not limited to: hard disk drives; RAID devices; random access memories (RAM); read-only memories (ROM), and all forms of flash memory storage devices. Examples of client electronic devices 22, 24 may include, but are not limited to, personal computer 22, personal computer 24, a smartphone (not shown), a personal digital assistant (not shown), a laptop computer (not shown), a tablet computer (not shown), a server computer (not shown), a series of server computers (not shown), a mainframe computer (not shown) and a dedicated network device (not shown). Client electronic devices 22, 24 may each execute an operating system, examples of which may include but are not limited to Microsoft Windows™, Android™, iOS™, Linux™, or a custom operating system.

Threat Intelligence Process

As will be explained below in greater detail, threat intelligence process 10 may be configured to obtain threat data from a variety of different sources and process the same to generate a master threat definition, which may be provided to customers so that it may be utilized by their network security systems.

Figure 2:
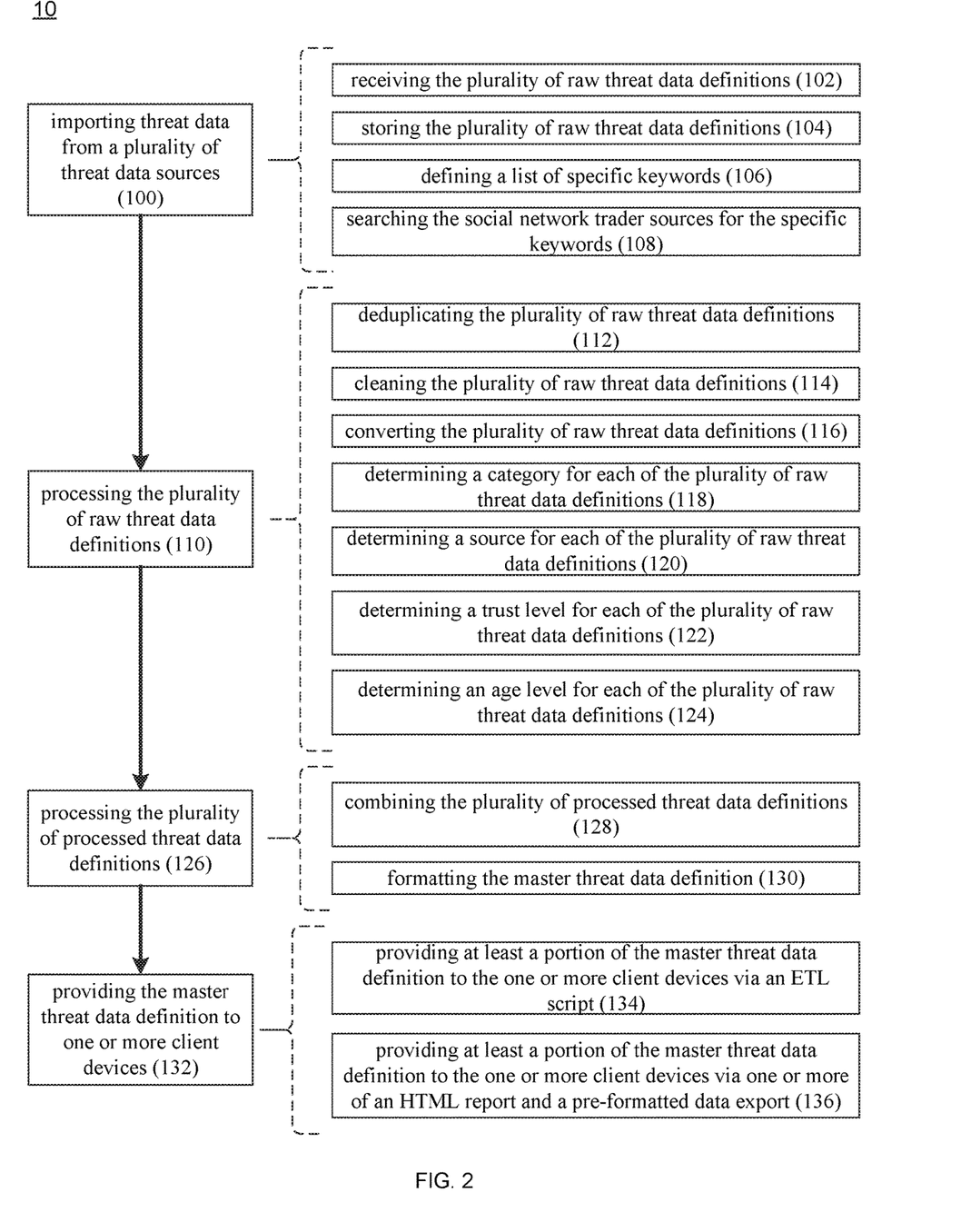
FIG. 2 is a flowchart of the threat intelligence process of FIG. 1 according to an embodiment of the present disclosure.

Referring also to FIG. 2, threat intelligence process 10 may import 100 threat data from a plurality of threat data sources, thus generating a plurality of raw threat data definitions. Examples of these threat data sources may include but are not limited to one or more of: social network trader source 26; public honeypot server 28; private honeypot server 30; and open source threat feed 32.

For this example, social network trader source 26 may be defined as any type of social network or public space (e.g., a blog) in which hackers/bad actors exchange information concerning their hacking experiences, expertise and insights. For example and on social network trader source 26, visitors may e.g., explain the manner in which they accessed a certain system, define certain vulnerabilities for a system, identify the IP addresses of devices that are vulnerable, identify and share preferred hacking tools & techniques, etc.

Public honeypot server 28 may be defined as a "bait" computing system that is exposed to the public and is configured to detect, analyze and record any attempts to compromise public honeypot server 28. For example, the IP address of the attacking computers may be recorded and any phishing mechanisms employed may be recorded. Basically, public honeypot server 28 may be configured to look like a potential victim. However, public honeypot server 28 may look for bad actors that are attacking, wherein public honeypot server 28 may be configured to play along and expose some non-sensitive data (that is configured to look like sensitive data) to trick the attacker into thinking that they are making progress with their attack; during which time public honeypot server 28 is actually gathering information on the type of attack utilized, the address of the attacker, and the methodologies employed during the attack.

Private honeypot server 30 is similar in functionality to public honeypot server 28, but is deployed differently. For example, while public honeypot server 28 may be out on the internet as an unassociated server, private honeypot server 30 may be associated with a company/specific target. For example, if company XYZ wanted to determine if/how hackers would try to attack their system, private honeypot server 30 may be assigned a specific "bait" IP address (or a specific "bait" DNS address, such as a URL) that is associated with company XYZ. A router may be configured to capture all network traffic directed to this "bait" IP address (or a specific "bait" DNS address, such as a URL) and reroute this traffic to private honeypot server 30 (which is typically located offsite and/or outside of the network of company XYZ. Private honeypot server 30 may then look for bad actors that are attacking honeypot server 30, play along with the attacker and expose some non-sensitive data (that is configured to look like sensitive data concerning company XYZ) to trick the attacker into thinking that they are making progress with their attack, all while private honeypot server 30 is actually gathering information on the type of attack being utilized, the address of the attacker, and the methodologies employed during the attack.

Open source threat feed 32 may be defined as one or more data feeds that identify known threats and methodologies of attack. These feeds (and this data) may be produced by individuals, groups, or corporations and may be used to identify threats in the form of malicious IP addresses, malicious domains, malicious binary programs or scripts and various hacking methodologies.

Accordingly and continuing with the above-stated example, threat intelligence process 10 may import 100 raw threat data definitions 34 from network trader source 26; may import 100 raw threat data definitions 36 from public honeypot server 28; may import 100 raw threat data definitions 38 from private honeypot server 30; and may import 100 raw threat data definitions 40 from open source threat feed 32.

When importing 100 threat data from a plurality of threat data sources (e.g., social network trader source 26, public honeypot server 28, private honeypot server 30, and open source threat feed 32), threat intelligence process 10 may receive 102 the plurality of raw threat data definitions (e.g., raw threat data definitions 34, 36, 38, 40) and may store 104 the plurality of raw threat data definitions (e.g., raw threat data definitions 34, 36, 38, 40) into one or more database tables (not shown) for subsequent processing.

In the event that the threat data source is a social network trader source 26, when importing 100 threat data from a plurality of threat data sources, threat intelligence process 10 may define 106 a list of specific keywords 42 and may search 108 social network trader source 26 for specific keywords 42. For example, specific keywords 42 that were defined 106 may concern a specific type of attack that has been/will be carried out, a specific company/organization that has been/will be targeted for attack, and a specific/known hacker. And once defined 106, threat intelligence process 10 may search 108 for specific keywords 42 within social network trader source 26.

Once imported 100, threat intelligence process 10 may process 110 the plurality of raw threat data definitions (e.g., raw threat data definitions 34, 36, 38, 40), thus generating a plurality of processed threat data definitions (e.g., processed threat data definitions 44, 46, 48, 50).

When processing 110 the plurality of raw threat data definitions (e.g., raw threat data definitions 34, 36, 38, 40), threat intelligence process 10 may perform various operations, examples of which may include but are not limited to:

Deduplicating 112 the plurality of raw threat data definitions: For example, threat intelligence process 10 may process 110 the plurality of raw threat data definitions (e.g., raw threat data definitions 34, 36, 38, 40) to deduplicate 112 any redundant pieces of data included within raw threat data definitions 34, 36, 38, 40. For example, if two or more of raw threat data definitions 34, 36, 38, 40 identify the same IP address as being a threat, threat intelligence process 10 may deduplicate 112 raw threat data definitions 34, 36, 38, 40 to remove the duplicate IP address.

Cleaning 114 the plurality of raw threat data definitions to remove false positives: For example, threat intelligence process 10 may process 110 the plurality of raw threat data definitions (e.g., raw threat data definitions 34, 36, 38, 40) to clean 114 raw threat data definitions 34, 36, 38, 40 to remove any incorrect information. Accordingly, IP addresses included within raw threat data definitions 34, 36, 38, 40 may be compared to a known list of non-threat "white hat" IP addresses to see if any of these non-threat "white hat" IP addresses were incorrectly identified within raw threat data definitions 34, 36, 38, 40. If so, threat intelligence process 10 may clean 114 raw threat data definitions 34, 36, 38, 40 to remove the non-threat "white hat" IP address.

Converting 116 the plurality of raw threat data definitions into a common format: For example, threat intelligence process 10 may process 110 the plurality of raw threat data definitions (e.g., raw threat data definitions 34, 36, 38, 40) to convert 116 raw threat data definitions 34, 36, 38, 40 into a common format. Specifically, raw threat data definition 34 may be in a database format; raw threat data definition 36 may be in a spreadsheet format; raw threat data definition 38 may be in a comma-delimited format; and raw threat data definition 40 may be in an ASCII text format. Accordingly, threat intelligence process 10 may convert 116 raw threat data definitions 34, 36, 38, 40 into a common format.

Determining 118 a category for each of the plurality of raw threat data definitions: For example, threat intelligence process 10 may process 110 the plurality of raw threat data definitions (e.g., raw threat data definitions 34, 36, 38, 40) to determine 118 a category for each of the pieces of data included within raw threat data definitions 34, 36, 38, 40. As discussed above, the data included within the raw threat data definitions may define the IP address of attacking computers, the phishing mechanisms employed by hackers, the manner in a hacker accessed a certain system, the vulnerabilities of a system, the IP addresses of devices that are vulnerable, preferred hacking tools, and preferred hacking techniques. Accordingly, threat intelligence process 10 may determine 118 a corresponding category for each piece of data included within each of raw threat data definitions 34, 36, 38, 40.

Determining 120 a source for each of the plurality of raw threat data definitions: For example, threat intelligence process 10 may process 110 the plurality of raw threat data definitions (e.g., raw threat data definitions 34, 36, 38, 40) to determine 120 a source for each of the pieces of data included within raw threat data definitions 34, 36, 38, 40, wherein the value of the data pieces may vary depending upon the reliability of the source.

Determining 122 a trust level for each of the plurality of raw threat data definitions: For example, threat intelligence process 10 may process 110 the plurality of raw threat data definitions (e.g., raw threat data definitions 34, 36, 38, 40) to determine 122 a trust level for each of the pieces of data included within raw threat data definitions 34, 36, 38, 40, wherein the trust level of the data pieces may vary depending upon the reliability of the source.

Determining 124 an age level for each of the plurality of raw threat data definitions. For example, threat intelligence process 10 may process 110 the plurality of raw threat data definitions (e.g., raw threat data definitions 34, 36, 38, 40) to determine 124 an age level for each of the pieces of data included within raw threat data definitions 34, 36, 38, 40, wherein the value of the data pieces may vary depending upon its age.

Threat intelligence process 10 may process 126 the plurality of processed threat data definitions (e.g., processed threat data definitions 44, 46, 48, 50) to form master threat data definition 52. When processing 126 the plurality of processed threat data definitions (e.g., processed threat data definitions 44, 46, 48, 50) to form master threat data definition 52, threat intelligence process 10 may combine 128 the plurality of processed threat data definitions (e.g., processed threat data definitions 44, 46, 48, 50) to form master threat data definition 52 and may format 130 master threat data definition 52 into a format that is compatible with the one or more client electronic devices. For example, threat intelligence process 10 may combine 128 processed threat data definitions 44, 46, 48, 50 to form a single comprehensive master list (i.e., threat data definition 52) and may format 130 master threat data definition 52 into a format that is compatible with the one or more client electronic devices (e.g., client electronic devices 22, 24). Specifically, threat intelligence process 10 may be configured to work with a SIEM (Security Information and Event Management) platform, an example of which includes but is not limited to Hewlett Packard's ArcSight™). Accordingly threat intelligence process 10 may format 130 master threat data definition 52 into a format that is compatible with an SIEM (Security Information and Event Management) platform (SIEM 54, 56) that is running on e.g., client electronic devices 22, 24, respectively).

Once properly formatted, threat intelligence process 10 may provide 132 master threat data definition 52 to one or more client electronic devices (e.g., client electronic devices 22, 24). When providing 132 master threat data definition 52 to e.g., client electronic devices 22, 24, threat intelligence process 10 may provide 134 at least a portion of master threat data definition 52 to e.g., client electronic devices 22, 24 via an ETL script (i.e., an Extract, Transform, Load script), examples of which may include but are not limited to an SSIS (i.e., SQL Server Integration Services) script. Additionally/alternatively, threat intelligence process 10 may provide 136 at least a portion of master threat data definition 52 to e.g., client electronic devices 22, 24 via an HTML (i.e., Hypertext Markup Language) report (or some other type of pre-formatted data export).

Private Honeypot

As discussed above, the threat data sources from which threat intelligence process 10 obtains raw threat data definitions 34, 36, 38, 40 may include private honeypot server 30, wherein private honeypot server 30 may be associated with a company/specific target and configured to allow the company/specific target to determine if/how hackers would try to attack their system.

Figure 3:
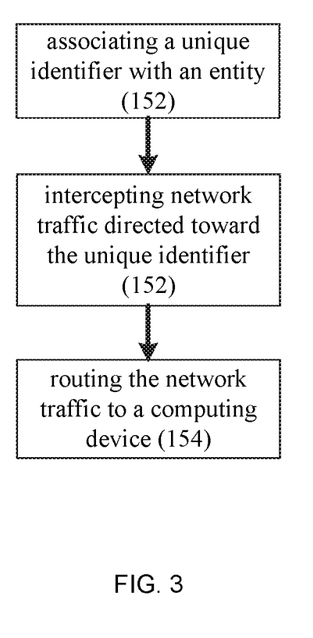
FIG. 3 is another flowchart of the threat intelligence process of FIG. 1 according to an embodiment of the present disclosure.

Referring also to FIG. 3, threat intelligence process 10 may associate 150 a unique identifier (e.g., unique identifier 60) with an entity (e.g., entity 62). Examples of entity 60 may include but are not limited to one or more of the following: a company; an organization; a corporation; and an individual. Examples of unique identifier 60 may include but are not limited to a DNS address (e.g., a URL) and/or an IP address. As discussed above, threat intelligence process 10 may associate 150 unique identifier 60 with entity 62. Accordingly, if entity 62 is the ABC Company and unique identifier 60 is a DNS address (e.g., a URL), an example of unique identifier 60 may include www.abccompany.biz. Alternatively, if entity 62 is the ABC Company and unique identifier 60 is an IP address, an example of unique identifier 60 may include 192.168.1.1 (wherein IP address 192.168.1.1 is associated with/registered to ABC Company).

Threat intelligence process 10 may intercept 152 network traffic 62 (e.g., data packets) directed toward unique identifier 60 and may rout 154 network traffic 62 to a computing device (e.g., private honeypot server 30). For example and when intercepting 154 network traffic 62 directed toward unique identifier 60, a router (e.g., router 64) may be positioned within a network/subnetwork (operated by entity 62) prior to the computing device (e.g., private honeypot server 30) so that network traffic directed toward unique identifier 60 may be intercepted on router 64 and routed 154 to private honeypot server 30. For security reasons, private honeypot server 30 may be physically located outside of the network/subnetwork operated by entity 62. Accordingly, a dedicated network connection (e.g., network connection 66) may be employed so that network traffic 62 may be routed through network connection 66 to honeypot server 30 (which may be located at a facility associated with/maintained by threat intelligence process 10).

Accordingly, private honeypot server 30 may be configured as "bait" for hackers concerning (in this example) the ABC Company, as all traffic directed toward unique identifier 60 may be intercepted 152 and routed 154 to private honeypot server 30. As discussed above, private honeypot server 30 may allow bad actors to attack private honeypot server 30, wherein private honeypot server 30 may also "play along" with the attacker and may expose some non-sensitive data (disguised to look like sensitive data concerning ABC Company) to trick the attacker into thinking that they are making progress with their attack. During the attack, private honeypot server 30 may gather information on the type of attack being employed, the IP/MAC address of the attacker, the methodologies of the attack, and the success/failure of the attack.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   importing threat data from a plurality of threat data sources, thus generating a plurality of raw threat data definitions;
   processing the plurality of raw threat data definitions, thus generating a plurality of processed threat data definitions, wherein processing the plurality of raw threat data definitions includes:
      deduplicating the plurality of raw threat data definitions;
      cleaning the plurality of raw threat data definitions to remove false positives;
      determining a category for each of the plurality of raw threat data definitions; and
      determining a source for each of the plurality of raw threat data definitions;
   processing the plurality of processed threat data definitions to form a master threat data definition;
   formatting the master threat data definition into a format that is compatible with one or more client electronic devices; and
   providing the master threat data definition to the one or more client electronic devices to enable the one or more client electronic devices to detect one or more threats.

2. The computer-implemented method of claim 1 wherein importing threat data from a plurality of threat data sources includes one or more of:
   receiving the plurality of raw threat data definitions; and
   storing the plurality of raw threat data definitions into one or more database tables.

3. The computer-implemented method of claim 1 wherein processing the plurality of raw threat data definitions includes one or more of:
   converting the plurality of raw threat data definitions into a common format;
   determining the trust level for each of the plurality of raw threat data definitions; and
   determining the age level for each of the plurality of raw threat data definitions.

4. The computer-implemented method of claim 1 wherein processing the plurality of processed threat data definitions to form a master threat data definition includes one or more of:
   combining the plurality of processed threat data definitions to form the master threat data definition.

5. The computer-implemented method of claim 1 wherein providing the master threat data definition to one or more client electronic devices includes:
   providing at least a portion of the master threat data definition to the one or more client electronic devices using one or more of a Hypertext Markup Language (HTML) report and a pre-formatted data export.

6. The computer-implemented method of claim 1 wherein the plurality of threat data sources includes one or more of:
   public honeypot servers;
   private honeypot servers;
   social network trader sources; and
   open source threat feeds.

7. A computer program product residing on a non-transitory computer readable medium having a plurality of instructions stored thereon which, when executed by a processor, cause the processor to perform operations comprising:
   importing threat data from a plurality of threat data sources, thus generating a plurality of raw threat data definitions;
   processing the plurality of raw threat data definitions, thus generating a plurality of processed threat data definitions, wherein processing the plurality of raw threat data definitions includes:
      deduplicating the plurality of raw threat data definitions;
      cleaning the plurality of raw threat data definitions to remove false positives;
   determining a category for each of the plurality of raw threat data definitions; and
   determining a source for each of the plurality of raw threat data definitions;
   processing the plurality of processed threat data definitions to form a master threat data definition;
   formatting the master threat data definition into a format that is compatible with one or more client electronic devices; and
   providing the master threat data definition to the one or more client electronic devices to enable the one or more client electronic devices to detect one or more threats.

8. The computer program product of claim 7 wherein importing threat data from a plurality of threat data sources includes one or more of:
   receiving the plurality of raw threat data definitions; and
   storing the plurality of raw threat data definitions into one or more database tables.

9. The computer program product of claim 7 wherein processing the plurality of raw threat data definitions includes one or more of:
   converting the plurality of raw threat data definitions into a common format;
   determining the trust level for each of the plurality of raw threat data definitions; and
   determining the age level for each of the plurality of raw threat data definitions.

10. The computer program product of claim 7 wherein processing the plurality of processed threat data definitions to form a master threat data definition includes one or more of:
    combining the plurality of processed threat data definitions to form the master threat data definition.

11. The computer program product of claim 7 wherein providing the master threat data definition to one or more client electronic devices includes:
    providing at least a portion of the master threat data definition to the one or more client electronic devices using one or more of a Hypertext Markup Language (HTML) report and a pre-formatted data export.

12. The computer program product of claim 7 wherein the plurality of threat data sources includes one or more of:
- public honeypot servers;
- private honeypot servers;
- social network trader sources; and
- open source threat feeds.

13. A computing system including a processor and memory configured to perform operations comprising:
- importing threat data from a plurality of threat data sources, thus generating a plurality of raw threat data definitions;
- processing the plurality of raw threat data definitions, thus generating a plurality of processed threat data definitions, wherein processing the plurality of raw threat data definitions includes:
  - deduplicating the plurality of raw threat data definitions;
  - cleaning the plurality of raw threat data definitions to remove false positives;
  - determining a category for each of the plurality of raw threat data definitions; and
  - determining a source for each of the plurality of raw threat data definitions;
- processing the plurality of processed threat data definitions to form a master threat data definition;
- formatting the master threat data definition into a format that is compatible with one or more client electronic devices; and
- providing the master threat data definition to the one or more client electronic devices to enable the one or more client electronic devices to detect one or more threats.

14. The computing system of claim 13 wherein importing threat data from a plurality of threat data sources includes one or more of:
- receiving the plurality of raw threat data definitions; and
- storing the plurality of raw threat data definitions into one or more database tables.

15. The computing system of claim 13 wherein processing the plurality of raw threat data definitions includes one or more of:
- converting the plurality of raw threat data definitions into a common format;
- determining the trust level for each of the plurality of raw threat data definitions; and
- determining the age level for each of the plurality of raw threat data definitions.

16. The computing system of claim 13 wherein processing the plurality of processed threat data definitions to form a master threat data definition includes one or more of:
- combining the plurality of processed threat data definitions to form the master threat data definition.

17. The computing system of claim 13 wherein providing the master threat data definition to one or more client electronic devices includes:
- providing at least a portion of the master threat data definition to the one or more client electronic devices using one or more of a Hypertext Markup Language (HTML) report and a pre-formatted data export.

18. The computing system of claim 13 wherein the plurality of threat data sources includes one or more of:
- public honeypot servers;
- private honeypot servers;
- social network trader sources; and
- open source threat feeds.

* * * * *